(12) United States Patent
Abreu

(10) Patent No.: US 10,006,286 B2
(45) Date of Patent: Jun. 26, 2018

(54) ROCK WALL CLOSURE DETECTION APPARATUS

(71) Applicant: NCM INNOVATIONS (PTY) LTD, Johannesburg (ZA)

(72) Inventor: Rual Abreu, Johannesburg (ZA)

(73) Assignee: NCM INNOVATIONS (PTY) LTD, Johannesburg (ZA)

(*) Notice: Subject to any disclaimer, the term of this patent is extended or adjusted under 35 U.S.C. 154(b) by 5 days.

(21) Appl. No.: 15/353,290

(22) Filed: Nov. 16, 2016

(65) Prior Publication Data

US 2017/0058672 A1 Mar. 2, 2017

Related U.S. Application Data

(63) Continuation-in-part of application No. 14/897,080, filed as application No. PCT/ZA2014/000045 on Sep. 2, 2014, now Pat. No. 9,664,043.

(30) Foreign Application Priority Data

Sep. 5, 2013 (ZA) .................. 2013/06661

(51) Int. Cl.
*E21F 17/18* (2006.01)
*G08B 21/18* (2006.01)

(52) U.S. Cl.
CPC .......... *E21F 17/185* (2013.01); *G08B 21/182* (2013.01)

(58) Field of Classification Search
None
See application file for complete search history.

(56) References Cited

U.S. PATENT DOCUMENTS 2,692,924 A 10/1954 Williams
3,460,258 A 8/1969 Bolen
(Continued)

FOREIGN PATENT DOCUMENTS

BE 493415 5/1950
FR 716766 12/1931
(Continued)

OTHER PUBLICATIONS

International Search Report for Application No. PCT/ZA2014/000045 dated Sep. 18, 2015 (5 pages).
(Continued)

*Primary Examiner* — Fekadeselassie Girma
(74) *Attorney, Agent, or Firm* — Michael Best & Friedrich LLP

(57) ABSTRACT

A hanging wall movement detection apparatus includes a rigid elongate member which extends between a first end and a second end, an indicator module which produces a warning signal when actuated, axially movably engaged with the elongate member, a ground engaging support which rigidly supports the indicator module off the ground, an actuator engaged with the elongate member between the first end and the indicator module, a biasing separator between the actuator and the indicator module. The actuator is drawn towards the indicator module, compressing the biasing separator, when the elongate member experiences a pulling force at the second end in an axial direction away from the indicator module, and the actuator contacts the indicator module to actuate the module to produce a warning signal if the pulling force is of a sufficient magnitude to overcome the bias of the biasing separator.

5 Claims, 9 Drawing Sheets

(56) References Cited

U.S. PATENT DOCUMENTS

| | | | |
|---|---|---|---|
| 3,594,773 | A | 7/1971 | Conkle et al. |
| 3,600,938 | A | 8/1971 | Waddell |
| 3,646,553 | A | 2/1972 | Conkle |
| 3,786,503 | A | 1/1974 | Webb |
| 3,826,128 | A * | 7/1974 | McVey ................ E21F 17/185 340/539.1 |
| 3,967,455 | A * | 7/1976 | Conway ............. E21D 21/0093 405/288 |
| 4,058,079 | A | 11/1977 | Taylor |
| 4,136,556 | A * | 1/1979 | Graham ................ E21F 17/185 340/690 |
| 4,155,326 | A | 5/1979 | Ellis |
| 4,156,236 | A * | 5/1979 | Conkle .............. E21D 21/0093 340/690 |
| 4,325,657 | A * | 4/1982 | Elders ................. E21D 21/004 405/259.1 |
| 4,426,642 | A * | 1/1984 | Poffenbarger ........ E21F 17/185 33/1 H |
| 4,491,022 | A * | 1/1985 | de la Cruz ............. E02D 1/022 73/783 |
| 4,570,553 | A | 2/1986 | Ito |
| 4,655,644 | A | 4/1987 | Lane |
| 4,740,111 | A * | 4/1988 | Gagnon ............. E21D 21/0093 405/259.1 |
| 5,185,595 | A * | 2/1993 | Friesen ................ E21D 21/02 340/540 |
| 5,307,053 | A | 4/1994 | Wills |
| 6,218,938 | B1 | 4/2001 | Lin |
| 8,164,473 | B2 | 4/2012 | Robertson, Jr. |
| 8,261,960 | B2 * | 9/2012 | Kilibarda ............... B23K 37/04 228/44.3 |
| 8,807,877 | B1 * | 8/2014 | Fox .................... E21D 21/0026 405/259.1 |
| 9,080,438 | B1 | 7/2015 | McCoy |
| 9,664,043 | B2 * | 5/2017 | Abreu .................. E21F 17/185 |
| 2003/0179089 | A1 | 9/2003 | Sweatt |
| 2007/0277385 | A1 | 12/2007 | Bullock |
| 2008/0278319 | A1 | 11/2008 | Meiksin |
| 2009/0251332 | A1 | 10/2009 | Senogles |
| 2010/0141464 | A1 | 6/2010 | Robertson, Jr. |
| 2013/0249700 | A1 | 9/2013 | Hsieh |
| 2014/0123773 | A1 | 5/2014 | Lemmer |

FOREIGN PATENT DOCUMENTS

| | | |
|---|---|---|
| GB | 191411916 | 2/1915 |
| WO | 96/39610 | 12/1996 |
| WO | 2012139163 | 10/2012 |

OTHER PUBLICATIONS

Office Action from the United States Patent and Trademark Office for U.S. Appl. No. 14/897,080 dated Oct. 26, 2016 (15 pages).

* cited by examiner

ROCK WALL CLOSURE DETECTION APPARATUS

BACKGROUND OF THE INVENTION

This invention relates to a rock wall closure detection apparatus for detecting and signalling movement of one rock wall in an excavation relative to another, to forewarn workers in the excavation of the possibility of rock fall and, more particularly, to an apparatus that can be re-deployable.

Most apparatus that are adapted to provide an indication of relative movement in rock walls are permanently or semi-permanently fixed in position, typically within a rock hole formed in a particular rock wall.

Such apparatus are not easily re-usable, or capable of easy dis-assembly and re-assembly in another location.

Moreover, there are circumstances when the integrity of the hanging wall is so compromised that it is unsafe to proceed into the space below the hanging wall to install such apparatus.

The present invention, at least partially, addresses the aforementioned problem.

SUMMARY OF INVENTION

The invention provides a rock wall closure detection apparatus which includes:
an elongate member, which is axially variably extensible between a first wall and a second wall of an underground excavation, comprising at least a first and a second segment which are resiliently axially compressible relatively to one another when the walls close;
an indicator module which produces a warning signal when actuated, attached to the first segment; and
an actuator attached to the second segment;
wherein on compression of the member, the actuator moves relatively to the module to actuate the module to produce the warning signal.

The first and second segments may be telescopically inter-engaged.

The elongate member may include a biasing member, for example a spring, located between the first and second segments.

The actuator may include a switch contact.

The indicator module may include at least a first signal circuit, a first signal device, and a power source to power the first circuit and the signal device.

The indicator module may include a housing at least partially within which the signal circuit and the power source are contained.

The first circuit may include a first switch.

The actuator may move relatively to the indicator module, between a first position, at which the contact and the first switch are spaced, and a second position, at which the contact engages the switch to actuate the first signal device to produce the warning signal.

The indicator module may include a second signal circuit, a second switch and a second signal device.

The first position may be a position at which the contact engages the second switch to produce a second signal which indicates that the apparatus is correctly pre-set.

The actuator may include a clamping platform which is slidably engaged to the second segment when not clamped to the segment to define the first position.

The actuator may include a rigid or a rigidified elongate element.

The elongate element may extend in parallel relationship with the elongate member.

The element may be a rod, a piston, a filament or the like.

The element may include the switch contact.

The warning signal and second signal may be either an audible or visible signal.

The first and the second signal device may include at least one LED of a first colour and a second colour respectively.

In another aspect, the invention provides a rock wall closure detection apparatus which includes:
a rigid elongate member which extends between a first end and a second end;
an indicator module which produces a warning signal when actuated, axially movably engaged with the elongate member;
a ground engaging platform which rigidly supports the indicator module off the ground;
an actuator engaged with the elongate member between the first end and the indicator module;
a biasing separator between the actuator and the indicator module;
wherein the actuator is drawn towards the indicator module, compressing the biasing separator, when the elongate member experiences a pulling force at the second end in an axial direction away from the indicator module; and
wherein the actuator contacts the indicator module to actuate the module to produce a warning signal if the pulling force is of a sufficient magnitude to overcome the bias of the biasing separator.

The elongate member may have be at least partially threaded with a threaded section.

The indicator module may include a first "alarm" circuit which has a first switch, a first signal device and a power source to power the first circuit and the first signal device.

The first switch may be positioned to make contact with the actuator, as the actuator is drawn adjacent the indictor module, to close the first circuit to energize the first signal device to produce the warning signal.

The indicator module may comprise of a first component and a second component which engages the support and a second biasing separator interposed between the components.

The first component may include the first circuit, the first switch, the first signal device, a second "pre-set" circuit with a second switch, a second signal device and the power source to power the first and second circuits and the first and second signal devices.

The second switch may be positioned to make contact with the second component, as the first component is pushed towards the second component, to close the second circuit to energize the second signal device to produce a pre-set signal.

The actuator may be adapted to move axially along the elongate member and to be set to a pre-set position on the member.

The actuator may include a nut which is threadedly engaged to the threaded section of the elongate member and which is turned to move the actuator to the pre-set position.

The pre-set position may be a position in which the actuator has compressed the first biasing separator and the second biasing separator sufficiently so that the second switch makes contact with the second component.

The apparatus may include a length adjustable pulling cord which is connected to the second end of the elongate member.

The cord may have an anchoring means to anchor the cord to a hanging wall so that when there is movement in the hanging wall this movement creates the pulling force which pulls on the cord and on the elongate member.

BRIEF DESCRIPTION OF THE DRAWINGS

The invention is further described by way of examples with reference to the accompanying drawings in which.

DESCRIPTION OF PREFERRED EMBODIMENTS

Figure 1:
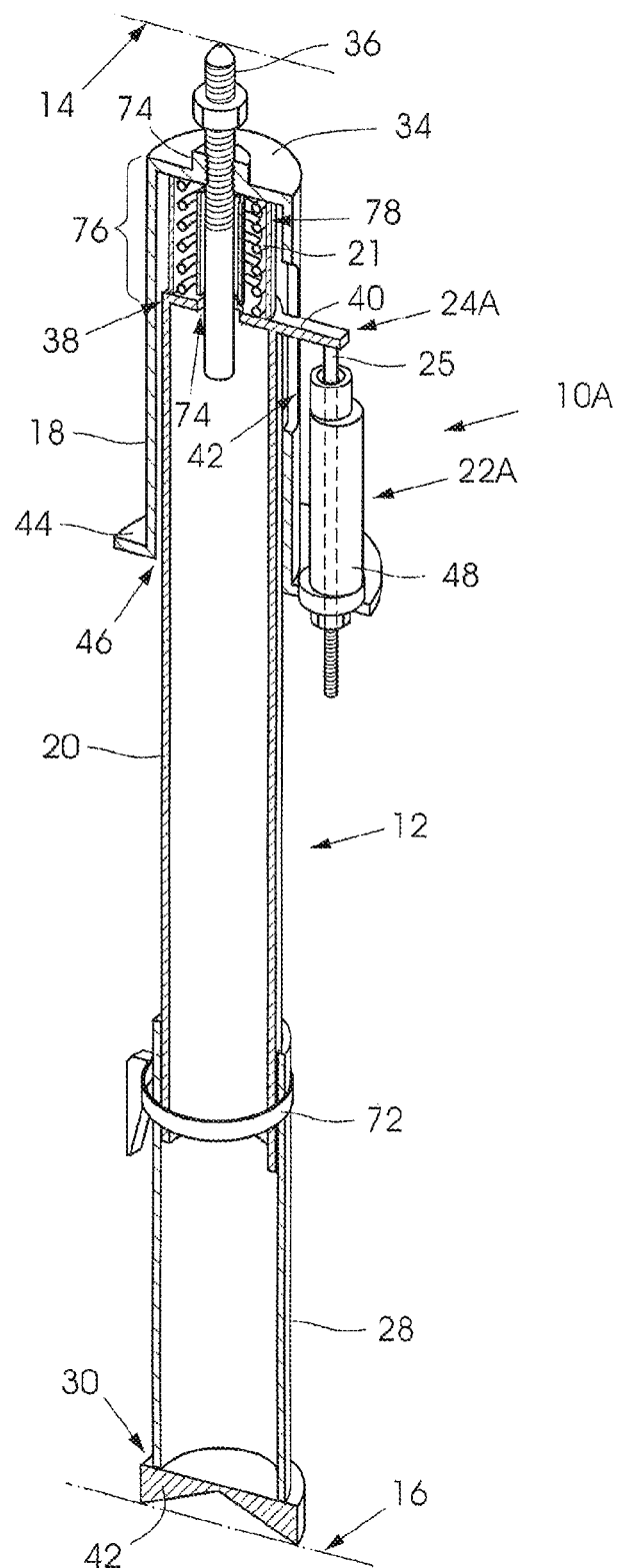
FIG. 1 is an isometric, longitudinally sectioned, illustration of a first embodiment of the invention.
Figures 4, 5:
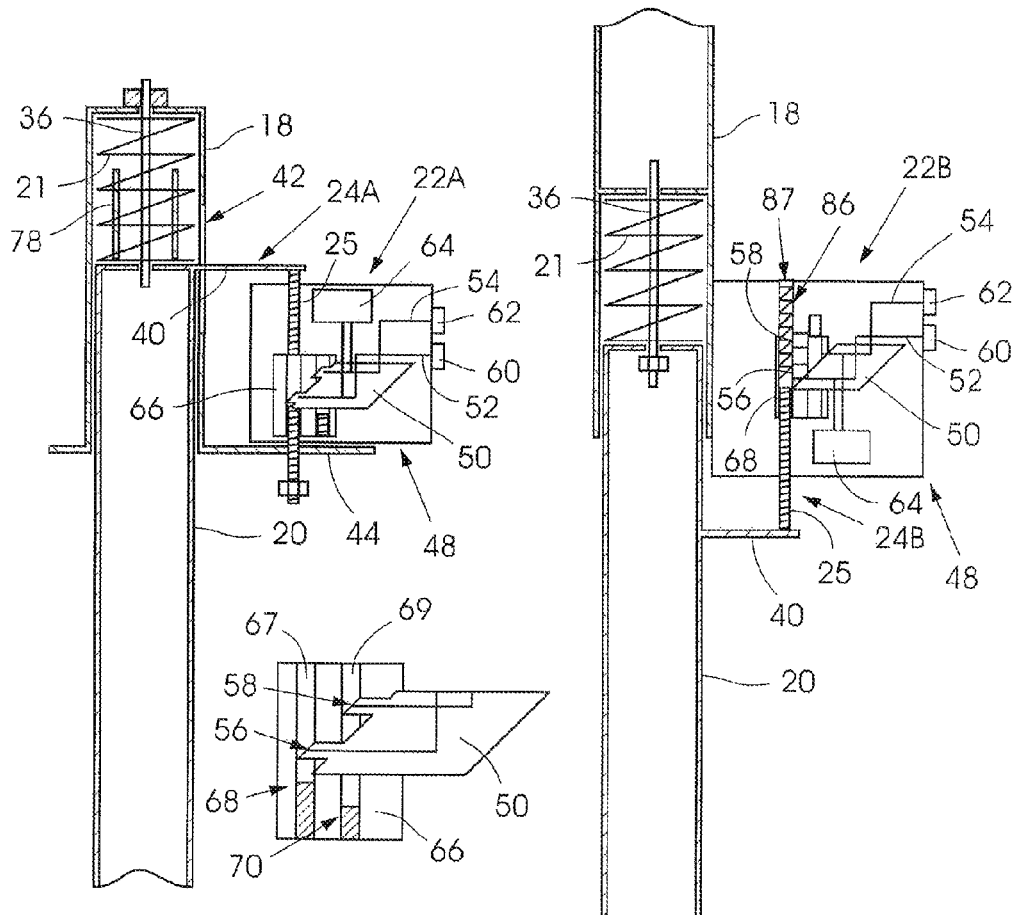
FIG. 4 is a schematic diagram of the rock closure detection apparatus of FIG. 1.
FIG. 5 is a schematic diagram of the apparatus of FIG. 2.

FIGS. 1 and 4 illustrate various embodiments of a rock wall closure detection apparatus, respectively designated 10A, 10B and 10C in accordance with the invention.

A first embodiment of the rock anchor 10A, illustrated in FIG. 1, includes an elongate member 12 which is axially variably extensible between a hanging wall 14 and a foot wall 16 of an underground excavation.

The elongate member 12 includes, at least, a first cylindrical section 18 and a second cylindrical segment 20. Each of these segments is telescopically inter-engaged with one another, having a spring 21 located between the first and the second segments to allow the elongate member to resiliently axially compress to accommodate closure of the hanging wall relatively to the footwall.

The apparatus 10A includes an indicator module 22A which produces a signal when actuated on closure of the walls, and to which is attached the first segment 18. An actuator 24A, which includes a rigid elongate element 25, is attached to the second segment. The element extends in parallel relatively to and spaced from the elongate element to penetrate the indicator module and to move therein, to actuate the module to produce the signal when wall closure is detected.

The movement of the hanging wall relatively to the foot wall is thus transcribed by the apparatus 10A into the relative movement of the element and the module.

In this particular embodiment, and with reference to FIG. 1, the elongate member 12 includes an additional lower third tubular segment 28 which provides major longitudinal adjustment to the elongate member 12 and which has, at a lower end 30, a foot 42.

At an opposed upper end 32 of the elongate member 12, defined by a capped end 34 of the first segment 18, a height-adjustable pin 36 is axially positioned to extend from the capped end to provide minor longitudinal adjustment.

The actuator 24A has a bridge formation 40 to which the element 25 is attached to the second segment 18 to position the element in a spaced and parallel configuration relatively to the elongate member 12. The bridge formation extends laterally from a closed end 38 of this segment, through a longitudinally extending slot 42 (see FIG. 2) formed through the wall of the first segment 18.

The indicator module 22A is carried on a laterally extending platform 44 located adjacent an open end 46 of the first segment.

The indicator module 22A of this particular embodiment is of a type described in South African patent application 2010/01315, the specification of which is here incorporated by reference, and described therein as a rock movement indicator.

In summary of the more detailed disclosure in 2010/01315, the indicator module 22A includes a housing 48 through which the element 25 longitudinally extends and which houses a printed circuit board 50 on which a first and a second circuit (respectively designated 52 and 54), are partially laid out, a battery 64, and a first and second signal device (respectively designated 60 and 62).

These circuits are diagrammatically represented in FIG. 4 and are adapted to electronically link a first and a second switch, respectively designated 56 and 58, to a respective signal device (60, 62) and to power each of these signal devices, by drawing power from the battery 64, when the respective switch is actuated. In this particular example, each signal device includes at least one LED. Also in this particular embodiment, each switch is a mechanically actuated switch located on a respective tab formed along one edge of the circuit board 50.

The actuator element 25 fixedly carries a sleeve 66 on which is defined a first axial groove 67, terminating in a first contact edge 68, and a second axial groove 69, terminating in a second contact edge 70, with each contact edge axially and laterally spaced from the other.

In use, the apparatus 10A is vertically positioned between the hanging wall 14 and the foot wall 16, with the foot 32 engaging the foot wall.

To vertically extend the elongate member 12 in situ into contact with the hanging wall, major height adjustment is achieved by telescopically extracting the second segment 20 from the third segment 28 until the tip of the height adjustment pin 36 nears the hanging wall. At this stage, the second and third segments (20 and 28) are locked in this position with the use of a clamp 72 (see FIG. 1) which encircles an upper end portion of the third segment.

Now, minor height adjustment can be achieved by turning the height adjustment pin 36 in a threaded mouth 74 of the capped end 34 of the first segment 18. This turning causes the pin to advance upwardly relatively to the mouth and the elongate member.

The capped end 34 of the first segment 18 is axially spaced from the closed end 38 of the second segment 20 to define a compressible segment 76 in which the spring 21 is located. With the elongate member 12 now spanning the vertical distance between the hanging and the foot wall, any movement of the hanging wall relatively to the foot wall, will cause the elongate member to axially compress. These compressive forces are accommodated about the compressible segment 76.

To prevent excessive compressive movement about this segment 76 during rock closure, which may potentially damage componentry in the indicator module 22A, a spacer 78 is also located in this segment. The spacer has a length which defines the maximum downward movement of segment 18 relatively to segment 20.

Once the elongate member 12 is assembled, the actuator element 25 is pre-set by moving the element, relatively to the housing 48, in a manner described in 2010/01315, so that the first contact edge 68 comes into contact with the first switch 56, with the respective tab moving along the first axial groove 67, and, with further movement, the tab breaks against the edge 68, activating the switch, the first circuit, and the illumination of the first LED 40.

As the hanging wall drops, due to overhead forces, the height adjustment pin 36 is forced downwardly to reactively push the first segment 18, to which it is fixedly attached, in the same direction. This action compresses the spring 21, reduces the length of the compressible segment 76, and lowers the platform 44 and the indicator module 22 positioned on the platform. The downward movement of the pin 36 is accommodated through an aperture 79 in the closed end 38.

As the second segment 20 does not move under this action, the actuator element 25 remains fixed in position. The housing 48 of the indicator module 22A moves downwardly over the element and it is this relative movement of the element to the indicator module that actuates the second signal device 62, as will be more fully described below.

With the element 25 pre-set in the manner described above and this pre-set position indicated by the illumination of the first LED which can, in this particular example, be a green LED, movement of the housing 48 relatively to the element 25 as described above causes the second contact edge 70 to contact, and break, the tab of the second switch 58. This actuates the second circuit 54 to energize the second LED 62, which in this particular example can be a red LED. The illumination of the red LED indicates to persons on the ground that the foot wall has moved a dangerously predetermined distance towards the hanging wall and that there is a high probability of rock failure.

Figure 2:
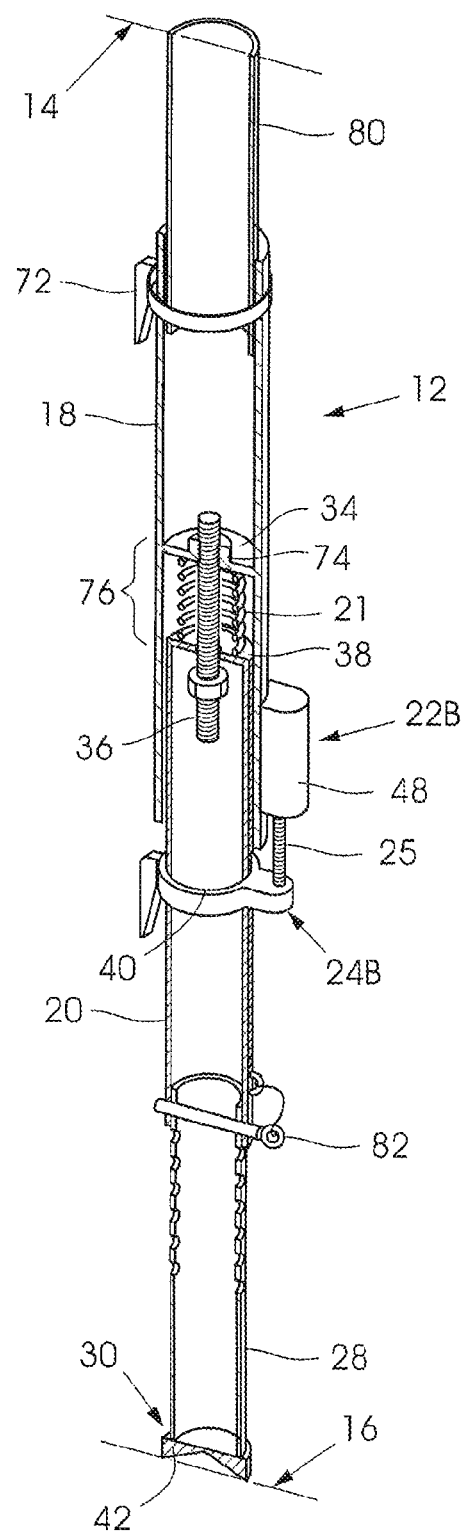
FIG. 2 is an isometric, longitudinally sectioned, illustration of a second embodiment of the invention.

FIGS. 2 and 5 illustrate a rock wall closure detection apparatus 10B, in accordance with a second embodiment of the invention.

In describing the second embodiment, and a third embodiment, the description of which follows, like or analogous features, relatively to the first embodiment, bear like designations.

The elongate member 12 of apparatus 10B is similarly extended, in situ, between the hanging and foot walls (12, 16). However, the elongate member of this embodiment has a fourth tubular segment 80 (see FIG. 2) telescopically engaged with the first segment 18, which provides the major height adjustment function, and it is similarly locked in position, once the member 12 has been appropriately lengthened, by a clamp 72.

The third tubular segment 28 is telescopically engaged with the second tubular segment 20, as with the embodiment 10A. However, it is only locked in position, relatively to the segment 20, at one pre-set position defined by a series of in-register holes passing laterally through the walls of the segments 20 and 28 and through which a release pin 82 is passed to secure this position.

Pulling on a pull-tie 84, attached at one end to the pin, to withdraw the pin from the holes, is a quick and remote way of collapsing the apparatus 10B to recover the apparatus prior to imminent hanging wall failure. Recovery of the apparatus is important as the apparatus is designed to be re-usable.

Another configurational difference between embodiments 10A and 10B is that the height adjustment pin 36 of the apparatus 10A no longer performs the function of height adjustment in the context of apparatus 10B. Instead, the pin 36 only functions to inter-engage the first and the second tubular element (10, 20), preventing these segments from pulling apart in the axial direction and about which the spring 21 is positioned. To provide minor height adjustment, the apparatus 10B can be provided with an analogous height adjustment device (not shown), attached to the upper end of the fourth tubular segment 80.

The housing 48 of the indicator module 22B is complementary moulded, on one surface, to marry to the outer surface of the first segment 18.

The actuator 24B includes a floating platform 40 which carries the element or piston 25 and which can be variably slidably positioned along the second segment 20, to pre-set the piston 25 relatively to the housing 48. Once the desired pre-set position is achieved, the platform is clamped to this position.

With reference to FIG. 5, the indicator module 22B, like its counterpart, includes a printed circuit board 50, first and second circuits (52, 54), first and second signal devices (60, 62), and a battery 64, all of which, with the exception of the signal devices, are housed within the housing 48.

However, the indicator module 22B differs from module 22A in that the first and second switches (56, 58) are not mechanically actuated. Each switch is a brush, axially spaced from one another, each of which is electrically actuated on contact with a contact point 68 on the piston 25.

With the elongate member 12 assembled to span the vertical distance between walls 14 and 16, movement of the hanging wall relatively to the foot wall will cause the member 12 to axially compress about the compressible segment 76.

The first segment 18 will move downwardly over the second segment 20 causing the piston 25 to move relatively to the housing 48, within a complementary channel 86 topped by a spring 87, from a pre-set position at which the contact point 68 contacts the first switch or brush 56, causing a green LED of the first signal device 60 to illuminate as an indication of pre-set to an advanced position within the channel 86.

The predetermined magnitude of the drop in the hanging wall 14 assessed to be dangerous, is transposed in the axial distance between the first and the second switches (56, 58). Thus, should the hanging wall experience a drop of this predetermined magnitude, the piston will advance from the pre-set position, to a position at which the contact point 68 contacts the second switch or brush 58, actuating the second circuit 54 to energize a red LED of the second signal device 62 as a warning.

Figure 3:
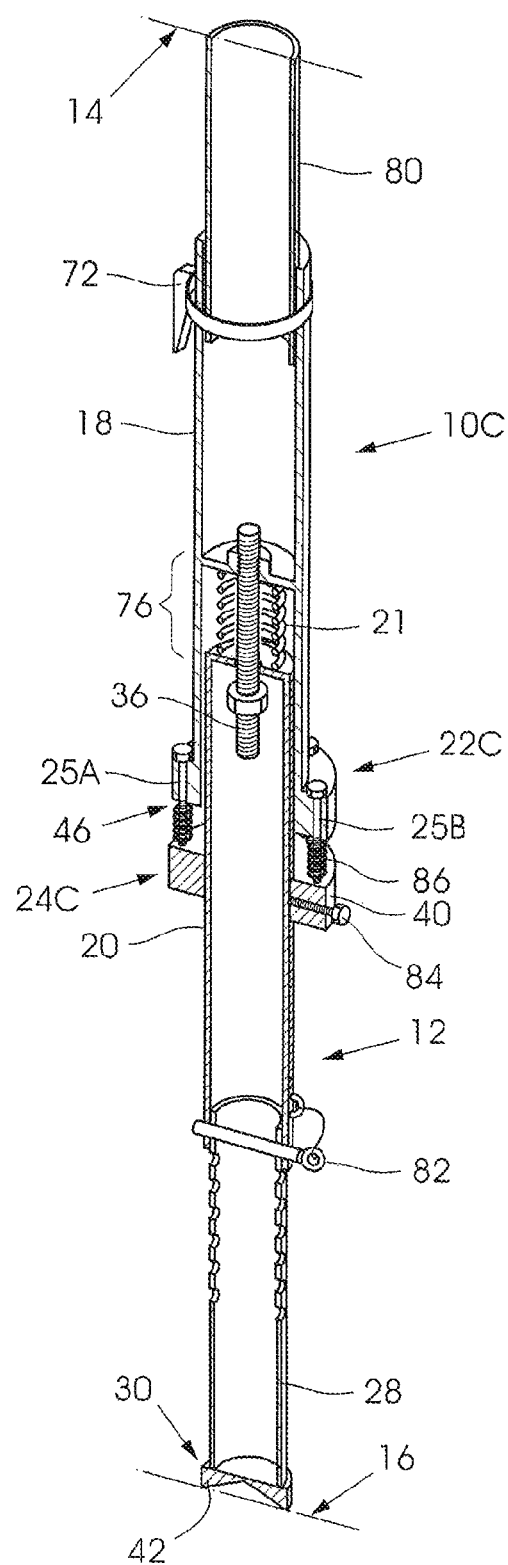
FIG. 3 is an isometric, longitudinally sectioned, illustration of a third embodiment of the invention.
Figure 6:
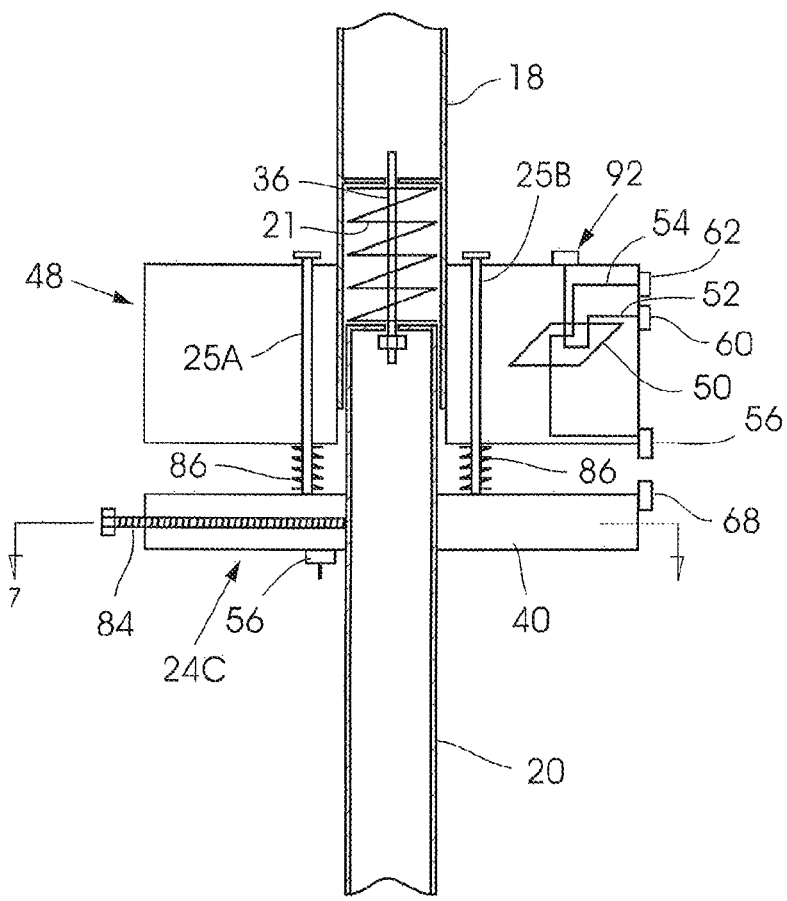
FIG. 6 is a schematic diagram of the apparatus of FIG. 3.
Figure 7:
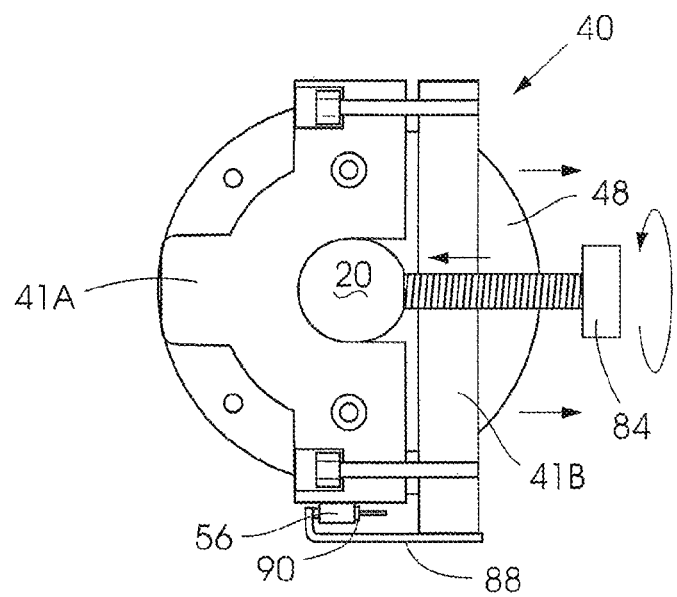
FIG. 7 is a view in cross section through line 7-7 of FIG. 6.

FIGS. 3, 6 and 7 illustrate a rock wall closure detection apparatus 10C, in accordance with a third embodiment of the invention.

The elongate member 12 of the apparatus 10C, having a first, second, third and fourth tubular segments (18, 20, 28 and 80) configured in substantively the same manner as with counterpart apparatus 10B.

The housing 48 of the indicator module 22C is a cylindrical disc-shaped housing that wraps around, and is fixedly located at, a lower end 46 of the first segment 18. The actuator 24C, like with actuator 24B, also includes a floating platform 40, comprising of two half sections 41A and 41B (see FIG. 7), which encircles the segment 20 to variably slidably engage the segment.

However, the actuator 24C differs from its counterpart 24B in that it carries a pair of rod-like elements (25A and 25B) that function to prevent lateral movement of the actuator relatively to the housing, but allowing relative axial movement. Neither of these elements of this embodiment carries a contact point and therefore do not function to contact a switch to actuate an alarm response. This is achieved in a different manner as will be described below.

To pre-set the platform 40 relatively to the housing 48, the platform is clamped into a fixed position on the second segment 20 by turning a clamp pin 84, which passes through platform section 41B, to draw section 41B laterally outwardly, as indicated by a directional arrow on FIG. 7 and to cause a free inner end of the pin to frictionally abut the segment 20.

Now that the platform 40 is fixed in place, and the elongate member 12 spanning the vertical distance between walls 14 and 16, any movement of the hanging wall relatively to the foot wall will cause the member to axially compress about compressible segment 76, and this movement is transposed into movement of the housing 48 downwardly towards platform 40. This movement compresses a pair of spacing springs 86, each of which is located around an interspersing part of a respective element 25.

With reference to FIG. 6, the indicator module 22C also includes a printed circuit board 50, with first and second circuits (52, 54), first and second signal devices (60, 62) and a battery 64.

The substantive difference between this embodiment of the apparatus 10C, and earlier described embodiments, is that the contact 68 is not located on an elongate element or piston (25) but on a perimeter edge of the platform 40. With sufficient movement of the housing 48 downwardly towards the platform, as explained above, the second switch 56 comes into contact with the contact 68 causing a red LED of the second signal device 62, to illuminate as a warning.

How the apparatus 10C is to be pre-set, which generally involves fixing the position of the platform 40 relatively to the housing 48 as has been explained, also differs in specifics from earlier described embodiments.

The platform section 41B includes a metallic contact arm 88 which extends from one end of section 41B towards, and partially beyond, section 41A. The arm is bent inwardly at its free end to provide a point at which contact with a first or remote switch 56 occurs when section 41B is drawn outwardly relatively to section 41A into a clamping position, actuated by the turning of clamp pin 84.

Without physical communication with the first circuit 52, communication that contact has been made and that the platform is in a pre-set position is made via an electromagnetic signal transmitted by a transmitter 90, integral with the switch 56, and received by a receiver 92.

The receiver is in electronic communication with the first circuit. On receipt of the switching signal from remote switch 56, the first circuit is energized to cause a green LED of the first signal device to illuminate as a pre-set indicator.

FIGS. 8, 9 and 10A to 10C illustrate a rock wall closure detection apparatus 10D, in accordance with another aspect of the invention.

In describing this aspect, on insofar as possible, like or analogous features relatively to the first aspect of the invention, embodied in embodiments 10A to 10C, bear like designations.

Figure 8:
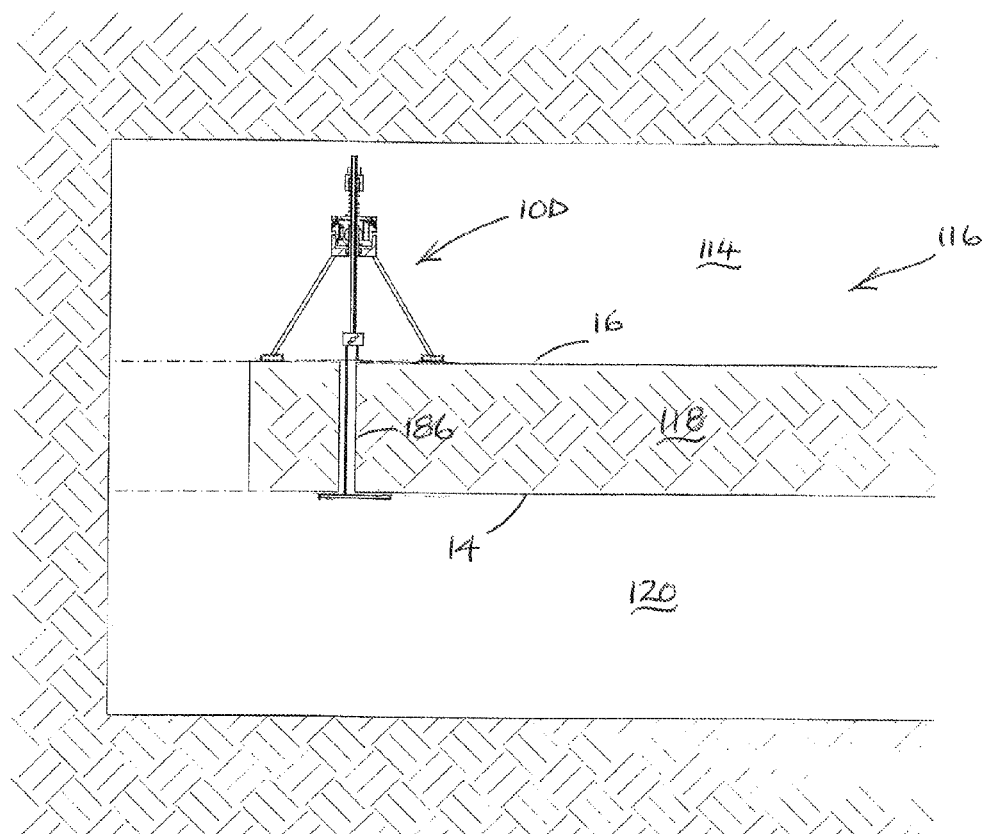
FIG. 8 schematically illustrates a layered underground excavation with a lower and an upper level and a hanging wall movement detection apparatus, in accordance with the invention, in the upper level and extending through to the lower level.

FIG. 8 illustrates the apparatus 10D in accordance with this aspect, positioned on the foot wall 16 of an upper layer 114 of an underground excavation 116.

Typically, the apparatus 10D will be positioned behind the advance of a reclaiming excavation of a dividing layer of rock 118 between the upper layer and a lower layer 120 of the excavation 116. The part of the dividing layer of rock that has been reclaimed is illustrated in dotted outline in FIG. 8.

By reclaiming the dividing layer 118 in this manner, the supportive integrity of the hanging wall 14 of the lower layer 120 is compromised, increasing the chance of rock fall from the hanging wall.

The apparatus 10D provides a means of detecting movement in the hanging wall 14 and of giving prior warning before possible collapse.

The hanging wall detection apparatus 10D includes a horizontally orientated threaded shaft 12. An indicator module 22 and an actuator or plunger 24 are concentrically mounted to the shaft, both independently movable along the axis of the shaft.

Figures 10A, 10B:
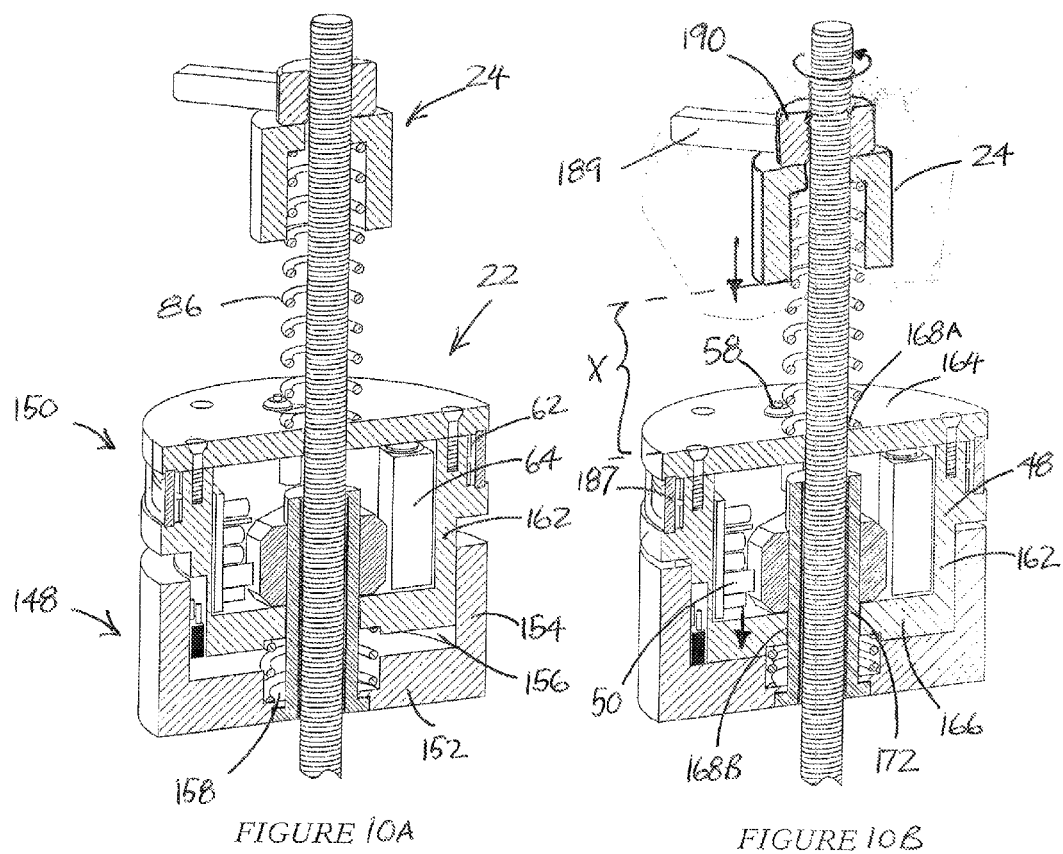
FIGS. 10A to 10C are each an isometric longitudinally sectioned view of an upper part of the detection apparatus of FIG. 9, showing a shaft engaged indicator module and an actuator module in three consecutive operable configurations.

A first spacing spring 86 concentrically locates over the shaft, between the indicator module and the plunger to maintain a spacing between the two components in a "unit off" and a "unit on" configuration as illustrated in FIGS. 10A and 10B respectively, and as will be further described below.

A tripod stand 138 (only a pair of legs of the stand are illustrated) supports the indicator module 22, and a lower end 30 of the shaft 12, above the foot wall 16.

A cable clamp 142 is engaged to the lower end 30 of the shaft 12. A steel cable 144 runs through the clamp, at one end of which an anchor 146 is engaged.

The indicator module 22 is comprised of an outer dish-shaped component 148 and an inner indicator component 150 which is at least partially received in the outer component.

The dish-shaped component comprises a base 152, a circumscribing wall 154 upstanding from the base and a cylindrical recess 156 defined by the wall and the base. The base is penetrated by a central aperture 158.

The inner component 150 has a substantially cylindrical housing 48, defined between a cylindrical sidewall 162 and an upper wall and a lower wall, 164 and 166 respectively. Both walls are penetrated by a respective central hole (168A, and 168B). Within the housing a first pre-set circuit and a second alarm circuit are present on a PCB 50 (the circuits are not individually illustrated for ease of illustration), powered by a battery 64.

The central aperture 158 of the base of the lower component 152, and the central holes 168 of the walls (164, 168) of the housing 160 are in register to provide passage through which a guide tube 172 passes from the base 152. It is through this guide tube that the shaft 12 passes through the indicator module 22 in movable engagement of this module with the shaft. The guide tube also prevents complete separation of outer component 148 from the inner component 150.

A lower portion 176 of the housing 48 locates within the cylindrical recess 156 of the outer component 148 with the lower wall 164 of the inner component 150 separated from the base 152 of the outer component and by a second interposing spring 178. On compression of this spring, as described below, the lower wall and the base will be brought into close proximity in a "unit on" configuration (see FIG. 10B).

The first pre-set circuit of the PCB 50 is closed remotely by a first limit switch 56 which is located on an outer surface of the cylindrical wall 162 of the housing's lower portion 176. The first circuit includes a strip of green LEDs 60. The second warning circuit of the PCB has a second limit switch 58 projecting from an outer surface of the top wall 164 of the housing 48. The warning circuit includes a strip of red LEDs 62.

The strips of green and red LEDs (60,62) respectively circumscribe the housing 48, beneath a Perspex cover 187, towards the top wall 164 so that, at all times, the LED strips are visibly externally of the outer component 148.

In use, a hole 186 is drilled through the dividing layer of rock 118 from the foot wall 16 to the hanging wall 14 as is illustrated in FIG. 8. The detection apparatus 10D is positioned over this hole with the tripod 138 overarching the hole.

The cable 144 is lowered, anchor end first, down through the hole, to emerge at the hanging wall end of the hole. To allow passage of the cable through the wall, the anchor 146 is pivotally attached to the steel cable off centre. This off-centre attachment allows the anchor to drop from an upright position, when it is travelling in the hole, to a horizontal position (illustrated in FIG. 9) when it emerges from the hole. The anchor, in this horizontal position, prevents the steel cable from being pulled back through the hole.

Figure 9:
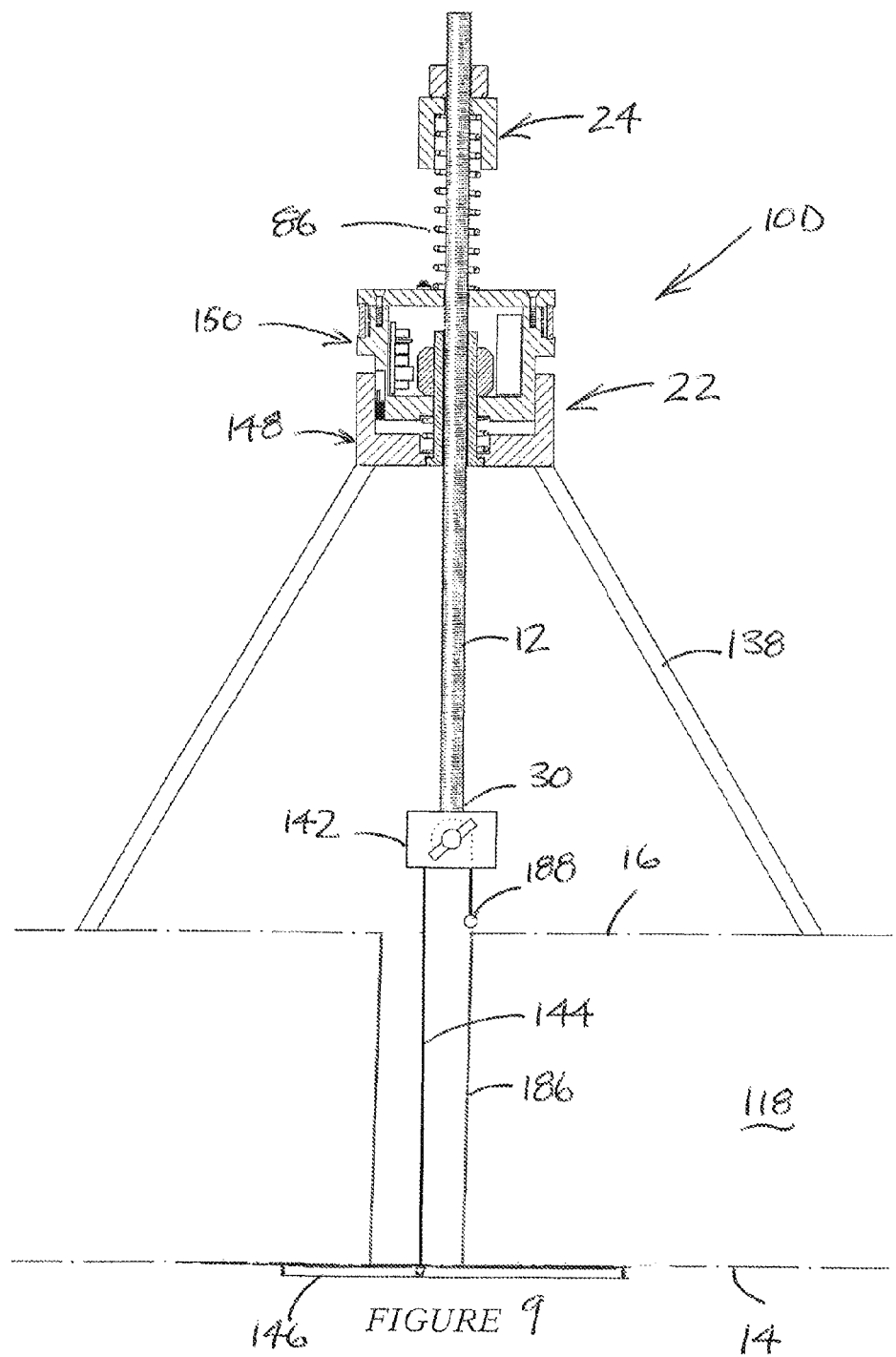
FIG. 9 schematically illustrates the hanging wall movement detection apparatus of FIG. 8.

Once the cable 144 is secure at the lower end, an operator will pull the cable taught by pulling on a free end 188, taking up the slack in the process. The operator will then use the cable clamp 142 to clamp the cable in this pre-tensioned position, as illustrated in FIG. 9. With the steel cable in pre-tension, the apparatus 10D remains in a "unit off" configuration as illustrated in FIG. 10A.

To pre-set the apparatus 10D to the "unit on" configuration of FIG. 10B, a handled nut 190 is used. The nut is threadedly engaged to an upper end of the threaded shaft, above the plunger 24. The handle 189 of the nut is turned to advance the nut downwardly (see directional arrows on FIG. 10B) moving the plunger as it proceeds which, in turn, pushes on the upper wall 164 of the housing 48 by an increasingly compressed spring 86. This action causes the inner component 150 of the indicator module 22 to depress (see direction arrow on FIG. 10B) into the cylindrical recess 156 of the outer component 148, compressing the second spring 175.

The nut 190 is caused to threadedly advance until the first limit switch 56 engages an inner surface of the base 152 of the outer component 148. The switch is depressed and this remotely actuates the first pre-set circuit to move through a check cycle, to check battery level and to ensure that there are no circuit faults in the first or second circuits, before energizing the strip of green LEDs as a visual indication that the apparatus 10D has been correctly pre-set. The indicating apparatus is now in a "unit on" configuration as is illustrated in FIG. 10B. The actuator is pre-set at a setting space X from the indicator module 22.

The rating of the first spring 86, in this particular example, determines the space X and therefore the pre-set limit of the apparatus 10. Increasing and decreasing the strength of the spring will respectively increase and decrease the setting space X.

Figure 10C:
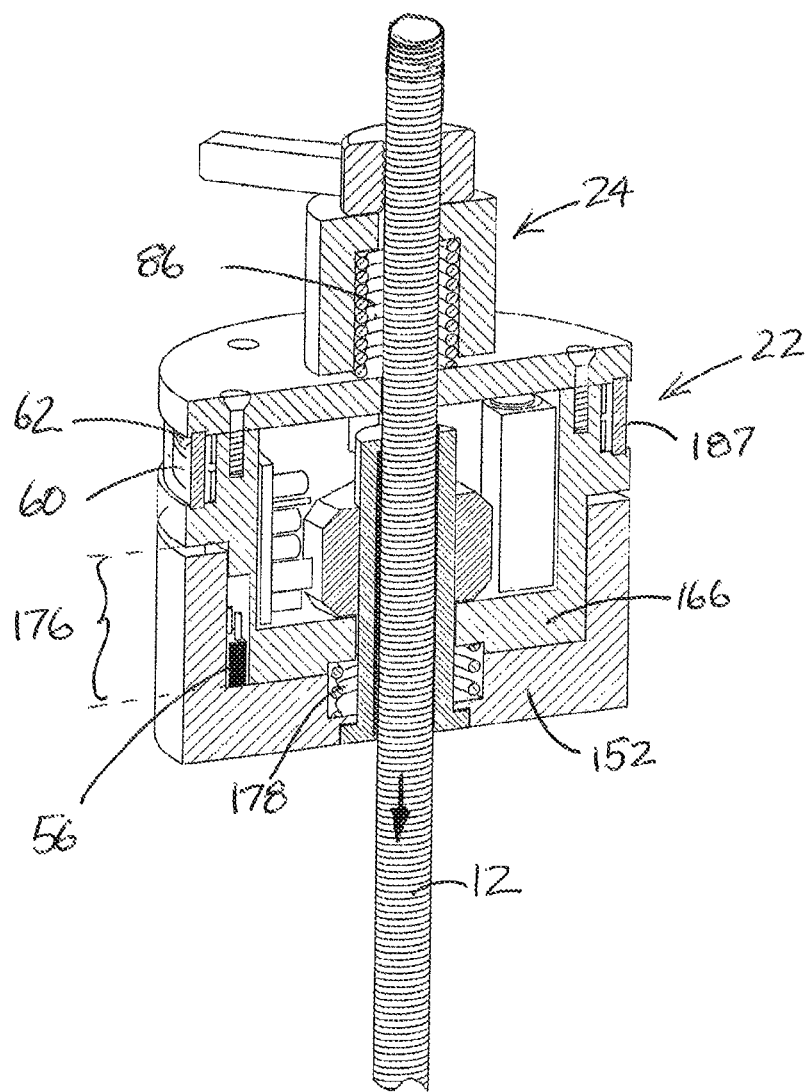

With the apparatus 10D in the "unit on" configuration, any movement of the hanging wall 14 relatively to foot wall 16 will pull on the steel cable 144 and thus on the threaded shaft 12. As the actuator is held in position relatively to the shaft 12, this downward axial movement of the shaft (illustrated with a directional arrow on FIG. 10C) will result in the spacing X closing. If there is sufficient movement in the hanging wall, which would substantively close the pre-set limit of the spacing X, the plunger will contact the second switch 58, depressing the switch. The second circuit will actuate to energize the strip of red LEDs 62 as a visual indication of movement in the hanging wall above the prescribed or danger limit. The apparatus is in a "unit triggered" configuration as illustrated in FIG. 10C.

Simultaneously, the green LEDs (60, 62) will be de-energized.

The green and red LEDs can remain consistently on, once energized, or they can be caused to strobe.

Should the cable 144 snap, when the apparatus 10D is in the unit on configuration and the green LEDs 60 are illuminated, the shaft 12 will spring back to the unit off configuration, lifting the switch 56 from the base 152 to turn off the green LEDs. Should this occur when the apparatus is in the unit triggered configuration, additionally the plunger 24 will lift from the second switch 58 to turn off the red LEDs 62.

The invention claimed is:

1. A hanging wall movement detection apparatus comprising:
    a rigid elongate member which extends between a first upper end and a second lower end;
    an indicator module which is axially movably engaged to the elongate member, which includes a first component, having a first "alarm" circuit with a first switch, a first signal device, a second "pre-set" circuit with a second switch and a second signal device and a power source to power the first and second circuits, and a second component;
    a ground engaging support which rigidly supports the second component of the indicator module off the ground;
    an actuator axially moveably engaged with the elongate member between the first upper end of the elongate member and the indicator module; and
    a first biasing separator between the actuator and the indicator module and a second biasing separator between the first component and a second component,
    wherein, the detection apparatus is configured to be in a unit-on configuration in which the second switch of the first component contacts the second component, the actuator is moved towards the first component to push the first component towards the second component and compress the second biasing separator, the first component is held in place by the actuator which is set to a pre-set position on the elongate member, and the second circuit is closed to energise the second signal device to produce a pre-set signal from the second signal device; and
    wherein, the detection apparatus is configured to be in a unit-triggered configuration in which the actuator contacts the first switch of the first component, the actuator is pulled towards the indicator module to compress the first biasing separator, the elongate member experiences a pulling force at the second lower end in an axial direction away from the indicator module, and the first circuit is closed to energise the first signal device to produce a warning signal from the first signal device.

2. A hanging wall movement detection apparatus according to claim 1 wherein the elongate member is at least partially threaded with a threaded section.

3. A hanging wall movement detection apparatus according to claim 1 wherein the actuator is a nut which is threadedly engaged to the threaded section of the elongate member and which is turned to move the actuator to the pre-set position and to hold the actuator in the pre-set position.

4. A hanging wall movement detection apparatus according to claim 1 which includes a length adjustable pulling cord which is connected to the second end of the elongate member.

5. A hanging wall movement detection apparatus according to claim 4 wherein the cord has an anchoring means to anchor the cord to a hanging wall so that movement in the hanging wall creates the pulling force which pulls on the cord and on the elongate member.

* * * * *